United States Patent

Hertz et al.

[15] 3,695,107
[45] Oct. 3, 1972

[54] METHOD OF MEASURING THE LEVEL OF A MATERIAL IN A TANK, AND AN APPARATUS FOR PRACTICING THIS METHOD

[72] Inventors: Carl Hellmuth Hertz, Skolbankovagen 8; Kjell O. T. Lindstrom, St. Hans Grand 25 A, both of Lund, Sweden

[22] Filed: June 1, 1970

[21] Appl. No.: 42,070

[52] U.S. Cl. .............................................. 73/290 R
[51] Int. Cl. ............................................. G01f 23/28
[58] Field of Search....73/290 R; 324/58.5 A, 58.5 B, 324/58.5 C, 58.5 R

[56] References Cited

UNITED STATES PATENTS

| | | | |
|---|---|---|---|
| 3,424,002 | 1/1969 | Johnson | 73/290 |
| 3,296,862 | 1/1967 | Ziniuk | 73/290 |
| 3,364,421 | 1/1968 | Bullwinkel | 324/58.5 B |
| 3,474,337 | 10/1969 | Petrick | 73/290 |

Primary Examiner—Louis R. Prince
Assistant Examiner—Denis E. Corr
Attorney—Beveridge & De Grandi

[57] ABSTRACT

A method of measuring the level of a material filled into a tank by using a substantially vertical electromagnetic delay line partly submerged in the material so that the submerged part of the line has another characteristic impedance than the line part above the level of the material, sending an electric pulse down the delay line and measuring the time it takes the pulse to reach the level of the material and the time it takes the pulse reflection generated at the level of the material to return to the input end of the line as a measure of the level of the material in the tank. An apparatus for this method has an electronic oscillating system connected to the input end of the delay line and comprising a triggered pulse generator and a pulse reflection detecting means for triggering the pulse generator each time a pulse reflection appears at the input end of the delay line, and a pulse repetition frequency meter connected to the electronic oscillating system for indicating the oscillating frequency thereof as a measure of the level of the material in the tank.

7 Claims, 1 Drawing Figure

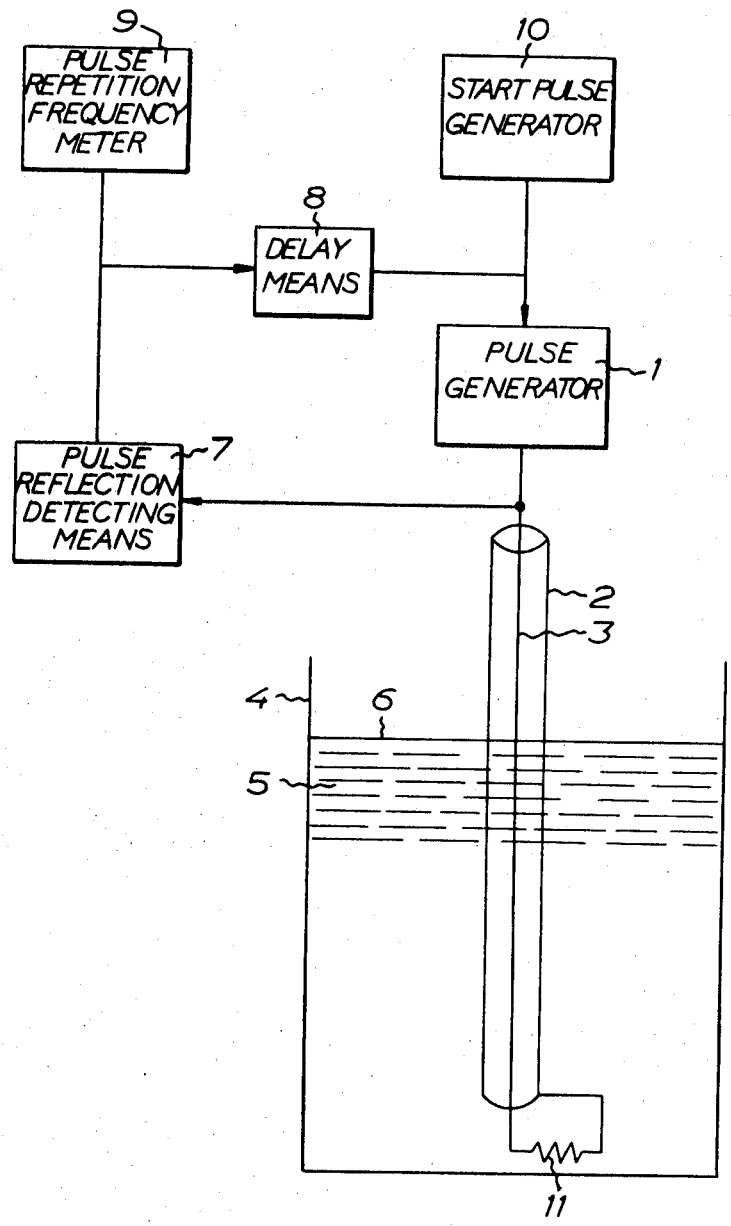

METHOD OF MEASURING THE LEVEL OF A MATERIAL IN A TANK, AND AN APPARATUS FOR PRACTICING THIS METHOD

There are many branches of industry where it is necessary to determine the level of liquids and other materials filled into large containers, tanks or the like. A special problem of this type is the measuring of the liquid level in, e.g., the tanks of sea-going tankers. These types of problem have hitherto been solved by different methods, the most common of which incorporates the use of a float, the position of which is measured by means of a suspension device. In addition hereto, there are used capacitive feelers, ultrasonic echo methods, methods for measuring the liquid pressure at the bottom of the tank, absorption of radioactive radiation etc. Practically all of these methods suffer from the disadvantage that they are temperature sensitive and dependent upon the physical properties of the liquid and upon the dependence of these properties on pressure, temperature etc.

The following is a description of a method which does not have these shortcomings since it depends for its function solely on the condition that the dielectricity constant of the liquid or the material is higher than about 1.5 or is electrically conductive. If, for example, there is immersed in such a liquid a section of a vertical coaxial cable which is so constructed that the liquid can penetrate between the two conductors and change the dielectricity constant in the space, this will result in a change of the characteristic impedance of that part of the cable which lies beneath the liquid level. At the boundary between gas and liquid there will thus occur a sudden change of impedance, and as a result short electric pulses having steep edges and transmitted down along the cable will be partly reflected at the surface of the liquid. By measuring the time which elapses between the transmission of such a pulse from the gas end of the cable and the return of the pulse reflected at the surface of the liquid, there is thus obtained a measure of the length of that part of the cable which is above the surface of the liquid. Such measurements can readily be effected with the well-known time domain reflectometer method.

This effect can be utilized for constructing an apparatus for measuring, e.g., the level of a liquid, and such an apparatus will now be described in greater detail in the following, reference being had to the accompanying diagrammatic drawing which illustrates a preferred embodiment of the invention.

The figure shows a levelling measuring apparatus according to the invention.

The apparatus illustrated in the drawing comprises a triggered pulse generator 1 which upon reception of a trigger pulse supplies a short electric pulse having steep edges to the upper end of a straight vertical coaxial cable consisting of a tubular open-ended outer conductor 2 and a central inner conductor 3. The coaxial cable is disposed in a liquid container 4 and is partly submerged in the liquid 5 which is contained therein and which, through the lower end of the tubular conductor 2, has penetrated into the space between the conductors 2, 3 of the coaxial cable and has the liquid surface 6. Because the liquid 5 is electrically conductive or has a dielectricity constant which is different from that of the air or other gas in the container 4, the liquid-filled part of the coaxial cable 2, 3 will have a different impedance than the gas-filled part of the coaxial cable. At its lower end, the coaxial cable terminates in a resistor 11, the impedance of which is adjusted to the impedance of the liquid-filled coaxial cable so that no reflections are produced by the terminal end of the cable. The impedance of the electronics system located at the upper end of the coaxial cable must be adjusted to the impedance of the gas-filled coaxial cable, so that no secondary reflections will occur at this point.

A pulse supplied by the pulse generator 1 to the coaxial cable 2, 3 will be partly reflected at the liquid surface 6 in consequence of the impedance burst of the coaxial cable which occurs at this point, and the reflected pulse is transmitted to a pulse reflection detecting means, e.g., a comparator 7 which detects the pulse and transmits a trigger pulse via a delay means 8 to the pulse generator 1, thereby causing the latter to transmit a new pulse to the coaxial cable. The result is that each time the comparator 7 is triggered by a reflected pulse, also the pulse generator 1 will be triggered after a given delay and will transmit a new pulse down along the cable 2, 3. In this manner, there is generated a frequency which depends upon the length of the coaxial cable above the liquid surface 6 and which is measured by means of a pulse repetition frequency meter 9. As the pulses reflected at the liquid surface 6 are of opposite sign with respect to the pulses transmitted by the pulse generator 1, a direct triggering of the comparator 7 by the pulses from the pulse generator 1 is easily prevented.

In order to ensure maximum reliability in operation by means of simple electronics circuits, it is important that the pulse generator 1 transmits pulses, the duration of which is less than twice the time it takes a step voltage to be propagated from the input end of the cable 2, 3 to the liquid surface 6 when this is at the maximum level possible in the tank.

The arrangement illustrated in the drawing has the advantage of directly generating a pulse repetition frequency which is inversely proportional to the length of the coaxial cable 2, 3 above the liquid surface 6, and this length is taken as a measure of the liquid level in the container 4. The measured value thus will not be dependent upon the physical properties of the liquid 5 as long as the reflection at the liquid surface 6 is sufficiently large to trigger the comparator 7. As the coaxial cable 2, 3 can be so designed that the pulse propagation rate will be practically independent of temperature, this measuring method thus does not have the disadvantages of other measuring methods for the same purpose.

It will be obvious that the coaxial cable 2, 3 can be designed in many different ways. Of particular interest is that it can be so designed that the pulse propagation rate along the cable will be low so that also shorter distances can be measured. The basic principle of such cables is previously known from the construction of electromagnetic delay lines for electric signals. Examples of such cable types are those where the inner conductor is wound in the form of a solenoid.

The delay means 8 serves to insure that the pulse from the pulse generator 1 does not affect the reflected pulse. Moreover, it can be used for adjusting the frequency range of the resulting measuring frequency.

The delay can be accomplished in different ways; for instance it is possible to use a one-shot multivibrator or a normal delay line for electric pulses. The pulse delay means 8 may also be connected between the pulse generator 1 and the coaxial cable 2, 3.

To initiate measuring, a pulse must be introduced into the oscillating system 1, 7, 8, which can be done by a starting transient, intentional self-oscillation in the system, or by means of an auxiliary starting pulse from a starting pulse generator 10. By detecting the output signal and by supplying starting pulses, for instance upon current failure, measuring can be started automatically. The maximum repetition frequency of the starting pulses should be restricted so that the pulses are easily distinguishable from normal output signals.

Although the above-mentioned embodiment has been described in connection with the measuring of liquid levels, the measuring principle indicated naturally may be used also for measuring the level of e.g. fine-granular material, such as grain.

For certain uses, the coaxial cable may be exchanged for other types of two-wire cable.

The invention is not limited to the embodiment described above and illustrated in the drawing, but may be varied in different ways within the scope of the appended claims.

What we claim and desire to secure by Letters Patent is:

1. An apparatus for measuring the level of a material filled into a tank, comprising an electromagnetic delay line substantially vertically arranged in the tank so as to have an input end section above the maximum level of the material in the tank and an end section submerged in the material in the tank, said delay line comprising two elongate conduit means forming an open space therebetween into which the material in the tank will penetrate for changing the characteristic impedance of said line within the end section submerged in the material in the tank, an electronic oscillating system comprising a triggered pulse generator having a triggering input and a pulse output connected to the input end of said line for supplying, upon triggering of said generator, an electric pulse to said line, and pulse reflection detecting means connected to the input end of said line and to said triggering input of said pulse generator for detecting a pulse reflection appearing at the input end of said line and generated by a pulse travelling down said line from said pulse generator upon passing into the material in the tank due to the change in characteristic impedance of said line at the level of the material in the tank, and for triggering said pulse generator in response to such detected pulse reflection for causing said system to oscillate with a pulse repetition frequency which is dependent on the length of said delay line above the level of the material in the tank, and pulse repetition frequency meter means connected to said system for indicating the oscillation frequency as a measure of the level of the material in the tank.

2. An apparatus according to claim 1, in which said oscillating system further comprises delay means connected in series with said pulse generator for decreasing the pulse repetition frequency of said system by a factor independent of the length of said delay line above the level of the material in the tank.

3. An apparatus according to claim 2, in which said delay means is connected in series between said triggering input of said pulse generator and said pulse reflection detecting means.

4. An apparatus according to claim 1, comprising termination means connected to the lower end of said delay line and having an impedance substantially equal to the characteristic impedance of said delay line when the space between said conduit means of said delay line is filled with the material in the tank.

5. An apparatus according to claim 1, in which said conduits of said delay line comprise a tubular outer conduit open at its ends and an inner conduit extending along the central axis of said tubular conduit and spaced therefrom, the annular space between said conduits being free and communicating with the interior of the tank through the open lower end of said tubular outer conduit.

6. An apparatus for measuring the level of a material filled into a tank, comprising an electromagnetic delay line substantially vertically arranged in the tank so as to have an input end section above the level of the material in the tank and an end section submerged in the material in the tank, said delay line comprising two elongate conduit means forming an open space therebetween into which the material in the tank will penetrate for changing the characteristic impedance of said line within the end section submerged in the material in the tank, an electronic oscillating system comprising a triggered pulse generator having a triggering input and a pulse output connected to the input end of said line for supplying, upon triggering of said generator, an electric pulse to said line, which pulse has a duration of less than twice the time it takes a step voltage to be propagated through said input end section of said delay line when said level is at its maximum and pulse reflection detecting means connected to the input end of said line and to said triggering input of said pulse generator for detecting a pulse reflection appearing at the input end of said line and generated by a pulse travelling down said line from said pulse generator upon passing into the material in the tank due to the change in characteristic impedance of said line at the level of the material in the tank, and for triggering said pulse generator in response to such detected pulse reflection for causing said system to oscillate with a pulse repetition frequency which is dependent on the length of said delay line above the level of the material in the tank, and pulse repetition frequency meter means connected to said system for indicating the oscillation frequency as a measure of the level of the material in the tank.

7. A method of measuring the level of a material filled into a tank, comprising the steps of sending an electric pulse down through an electromagnetic delay line substantially vertically arranged in the tank so as to be partially submerged in the material in the tank, said material causing a change of the characteristic impedance of said line at the level of the material in the tank, receiving and detecting a pulse reflection appearing at the upper end of the delay line and generated by the pulse travelling down the delay line upon passing into the material in the tank due to the change in characteristic impedance of the delay line at the level of the material in the tank, sending a new pulse down through the delay line for each received and detected pulse reflection appearing at the upper end of the delay line and measuring the pulse repetition frequency which serves as a measure of the level of the material in the tank.

* * * * *